United States Patent [19]
Bernaerts

[11] 3,938,544
[45] Feb. 17, 1976

[54] VALVE WITH HEAT TRANSPORT MONITOR FOR LEAKAGE DETERMINING RATE
[76] Inventor: Henry J. Bernaerts, R.F.D. 10, Box 1610, Laurel Lane, Annapolis, Md. 21401
[22] Filed: May 28, 1974
[21] Appl. No.: 473,853

[52] U.S. Cl. ............... 137/334; 137/551; 73/15 R; 73/46; 73/204
[51] Int. Cl.² ............... F16K 49/00; G01F 1/68
[58] Field of Search ........ 137/334, 341, 551; 73/46, 73/204, 40

[56] References Cited
UNITED STATES PATENTS
2,430,122 11/1947 Grace ............... 137/551
2,646,065 7/1953 Tyson ............... 137/341 X Primary Examiner—Henry T. Klinksiek
Attorney, Agent, or Firm—R. S. Sciascia; Q. E. Hodges

[57] ABSTRACT

A valve having means for measuring leakage through the valve. The valve body has a small heater in the leakage flow path downstream of the upstream seal and a heat sensor upstream of the downstream seal in the leakage path; fluid that leaks past the upstream seal is heated and its presence detected by the heat sensor which then indicates the fact that the valve is leaking.

5 Claims, 3 Drawing Figures 3,938,544

VALVE WITH HEAT TRANSPORT MONITOR FOR LEAKAGE DETERMINING RATE

The invention described herein may be manufactured and used by or for the Government of the United States of America for Governmental purposes without the payment of any royalties thereon or therefor.

BACKGROUND OF THE INVENTION

There are many piping networks wherein it is necessary to determine if the valves in the network are leaking. For example, pipes in ships and nuclear power plants have safety valves in them which are also used in cases of emergencies to stop all flow through the pipes. Naturally, these safety valves must not leak when they are closed. Since these valves are usually not used except in emergencies, they sometimes deteriorate due to lack of use. Therefore, it is standard practice to leak test these valves at periodic intervals.

The usual way to leak check a valve requires that the valve be closed and the pipe downstream of the valve be drained and connected to a leakage measuring device to determine the amount of leakage past the valve. This means that flow through the pipe is stopped, which means that the system incorporating that pipe is shut down. Many other pipes are usually also connected to this pipe downstream of the valve, which must also be shut off. However, their shut-off valves might also leak, and contribute to the flow past the leakage measuring device. Therefore, two valves in series in each of these connected pipes must be closed in order to completely prevent flow through these pipes. Numerous valves in interfacing systems thus have to be shut down, especially when cooling systems are involved. The ship must therefore be alongside a tender, in drydock, or in a shipyard when valves are leak checked by this method. The present invention allows these valves to be leak checked while the pipeline is in use, thereby preventing the need for shutting down the whole system when the valves are checked.

SUMMARY

Briefly, the present invention is a valve that has a small heater in the leakage flow path and a heat sensor downstream of the heater but still in the leakage flow path. Fluid that leaks past the valve seal is heated by the heater; when it reaches the heat sensor its presence is indicated by rise in temperature. The valve can be calibrated to give a quantitative as well as a qualitative indication of leakage.

OBJECTS OF THE INVENTION

Accordingly, it is an object of the present invention to provide a novel valve.

It is a further object to provide a valve which has within it a means for indicating the presence or absence of leakage through the valve.

It is a further object to provide a valve having means for indicating the quantity of leakage flow through it.

Other objects and advantages of the present invention will be obvious from the following specification and accompanying drawings.

DESCRIPTION OF THE PREFERRED EMBODIMENT

Figure 1:
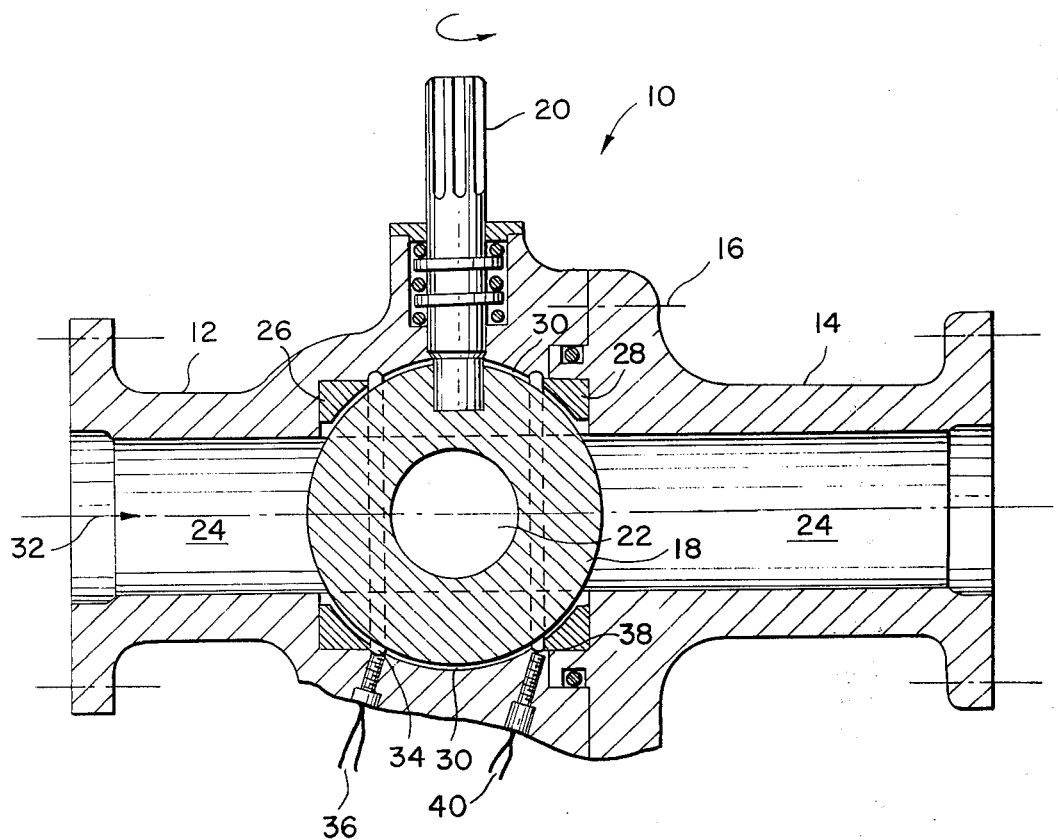
FIG. 1 is a cross section of a ball valve according to the present invention.

FIG. 1 shows a ball valve 10 having a leakage detector according to the present invention. The valve, of conventional construction except for the leakage detector, is comprised of body halves 12 and 14 which are held together by bolts 16, which enclose ball closure member 18 between them. The valve is shown in the closed position; to open the valve, the ball 18 would be rotated 90 degrees by turning stem 20 in the direction indicated, which would align passage 22 in ball 18 with the passages 24 in the valve body halves. Seals 26 and 28, which are composed of any preferred sealing material, normally prevent the leakage of fluid through the valve when it is closed. Gap 30 between ball 18 and the valve body is the path followed by any fluid which leaks past the seals.

With flow through the valve as shown by arrow 32, seal 26 is the upstream seal. Directly downstream of this seal is the heater 34 which completely surrounds ball 18 perpendicular to the axis of passage 24 as shown and which heats any fluid which leaks past seal 26. Heater 34 may be any type of heater but is preferably a small electric resistance heater which is flush with the inside contours of valve body half 12. It does not project into gap 30 in order to prevent contact between it and ball 18. Electrical leads 36 are connected to any convenient power source to energize the heater.

Temperature sensor 38 is placed just upstream of downstream seal 28 as shown; this can be any form of temperature sensing device which completely surrounds ball 18 perpendicular to the axis of passage 24 although the preferred device is a thermocouple. Electrical leads 40 are connected to any form of readout device or alarm system compatible with the particular thermocouple being used.

Operation of the device is as follows. The valve is closed and a temperature reading is taken at temperature sensor 38 to determine the normal operating temperature of that part of the valve. Next, heater 34 is turned on and the temperature measured by sensor 38 is allowed to stabilize at a higher level; this level will be determined by the characteristics of heater 34, but it will be lower than what would be measured at heater 34 due to conduction losses through the body of the valve. If only the presence or absence of leakage through the valve is desired, all that is necessary is to look for a temperature rise at thermocouple 38; no rise indicates no leakage. The amount of temperature rise will give a qualitative idea of the amount of leakage without calibration; that is, the higher the rise, the greater the amount of leakage. If desired, the valve can be calibrated for known upstream pressures, ambient temperatures, etc. in order to get a temperature reading that can be correlated to quantity of leakage flow.

Figure 3:
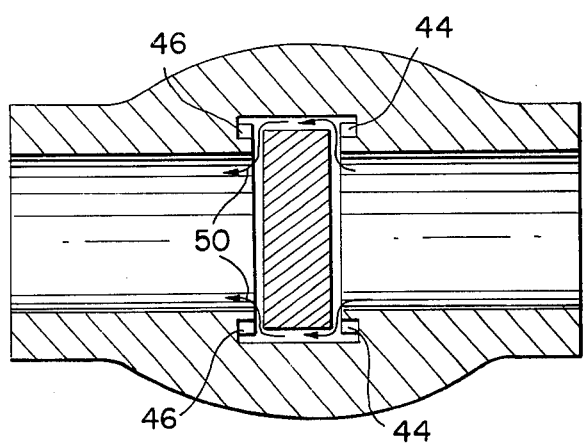
FIG. 3 is taken on line 3-3 of FIG. 2.
Figure 2:
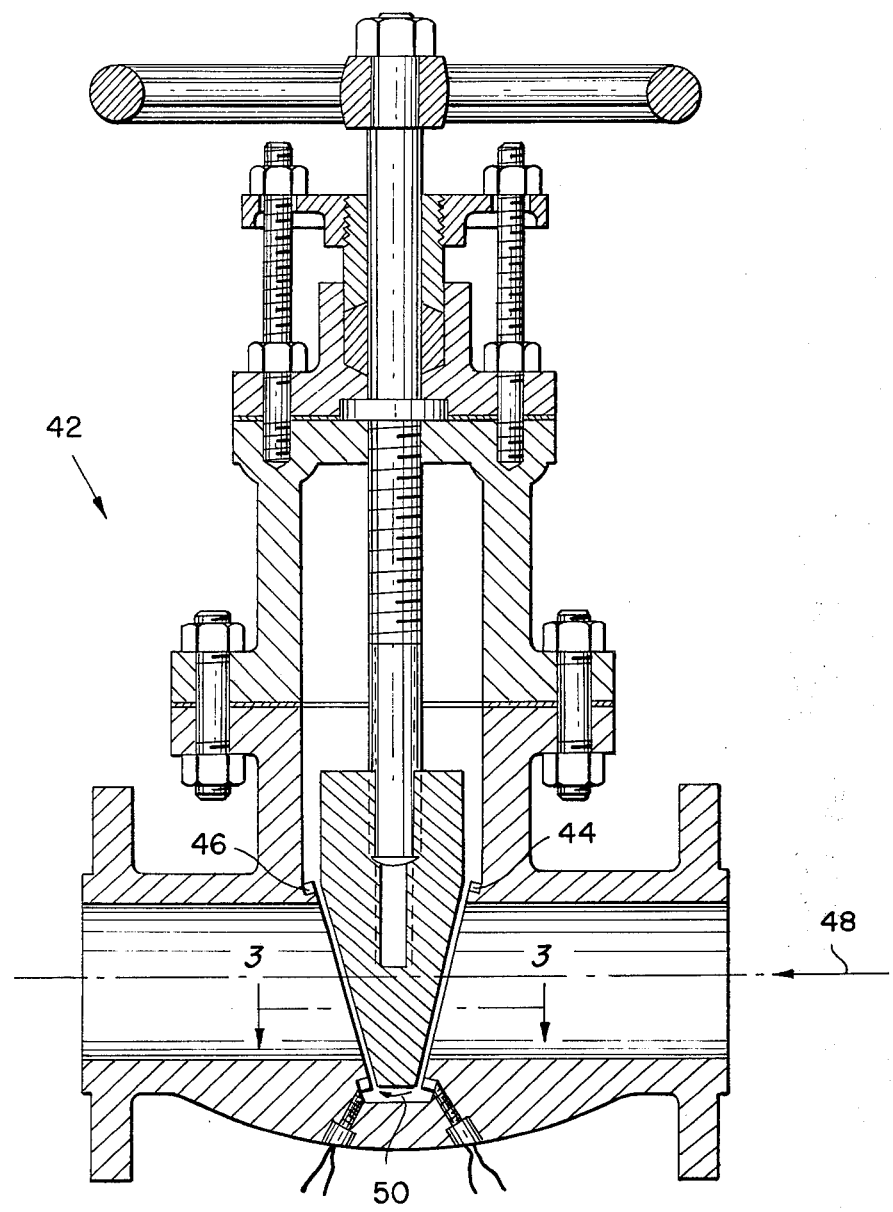
FIG. 2 is a cross section of a gate valve according to the present invention.

FIGS. 2 and 3 show a gate valve 42 which incorporates the present invention. Gate valve 42 is of conventional design except for the addition of heater 44 and temperature sensor 46 as shown. Flow is in the direction of arrow 48. The leakage flow path is shown by arrows 50. Heater 44 surrounds the inlet to the valve, hence all leakage past the upstream seal will be heated; likewise, heat sensor 46 surrounds the outlet from the valve and will detect the flow of any heated leakage fluid within the valve. The operation of the leakage detection system of this valve is the same as the operation of the system in the case of the ball valve.

It is possible that the leakage detector can be used while the valve is open and fluid is flowing through it; however, if the fluid is at a temperature that is considerably above or below ambient, the temperature increase due to the heater may be neglible even with large leakage flows. In this case the valve will have to be closed before the leak check is made.

It will be obvious that the principles of the present invention can be applied to any other type of valve that has a leakage flow path that is separate from the main flow path; all that is required is a heater in the upstream portion of the leakage path and a thermocouple or other type of temperature sensor in the downstream portion of the leakage path. As with the ball and gate valves, a rise in temperature when the valve is closed and the heater is energized indicates that the valve is leaking.

Obviously, many modifications and variations of the present invention are possible in light of the above teachings. It is therefore to be understood that within the scope of the appended claims, the invention may be practiced otherwise than as specifically described.

What is claimed is:
1. A valve comprising:
   a body;
   a closure element within said body;
   sealing members between said valve body and said closure element; and
   means within said valve body for determining the leakage of the fluid of the main fluid flow controlled by said valve, between said closure element and said sealing members.
2. A valve as in claim 1 wherein said means for determining said leakage includes means within said valve body for heating said leakage fluid.
3. A valve as in claim 2 including means within said valve body for determining the temperature of said leakage fluid.
4. A valve as in claim 3 wherein said means for heating said leakage comprises an electric resistance heater.
5. A valve as in claim 4 wherein said means for determining the temperature of said leakage comprises a thermocouple.

* * * * *